(12) United States Patent
Ikeda et al.

(10) Patent No.: US 10,748,700 B2
(45) Date of Patent: Aug. 18, 2020

(54) COIL STRUCTURE AND MAGNETIC COMPONENT

(71) Applicant: SHINDENGEN ELECTRIC MANUFACTURING CO., LTD., Tokyo (JP)

(72) Inventors: Kosuke Ikeda, Hanno (JP); Yoshiaki Hiruma, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 417 days.

(21) Appl. No.: 15/510,997

(22) PCT Filed: May 31, 2016

(86) PCT No.: PCT/JP2016/065985
§ 371 (c)(1),
(2) Date: Mar. 13, 2017

(87) PCT Pub. No.: WO2017/208332
PCT Pub. Date: Dec. 7, 2017

(65) Prior Publication Data
US 2018/0166208 A1    Jun. 14, 2018

(51) Int. Cl.
*H01F 27/24* (2006.01)
*H01F 27/32* (2006.01)
(Continued)

(52) U.S. Cl.
CPC ............ *H01F 27/323* (2013.01); *H01F 5/06* (2013.01); *H01F 27/22* (2013.01); *H01F 27/24* (2013.01);
(Continued)

(58) Field of Classification Search
CPC ......... H01F 27/22; H01F 27/2804; H01F 6/06
(Continued)

(56) References Cited

U.S. PATENT DOCUMENTS 6,081,179 A *   6/2000   Kato ..................... H01F 6/04
                                                    335/299
6,194,665 B1 *  2/2001   Kuribayashi ............ B32B 3/28
                                                    174/120 R
(Continued)

FOREIGN PATENT DOCUMENTS

CN        1666303 A      9/2005
EP        1530223 A1     5/2005
(Continued)

OTHER PUBLICATIONS

Search Report and Opinion from Netherlands Patent Application No. 2018997 dated Mar. 1, 2018.
(Continued)

*Primary Examiner* — Alexander Talpalatski
*Assistant Examiner* — Joselito S. Baisa
(74) *Attorney, Agent, or Firm* — Ladas & Parry, LLP

(57) ABSTRACT

A coil structure has a coil 150 including conductors, and insulating sheets 100 provided between the conductors included in the coil 150. Two or more insulating sheets 100 are provided. The two or more insulating sheets 100 have two or more types of insulating sheets 100 having at least different thermal conductivity or different permittivity.

5 Claims, 22 Drawing Sheets

(51) Int. Cl.
  *H01F 30/10* (2006.01)
  *H01F 5/06* (2006.01)
  *H01F 27/22* (2006.01)
(52) U.S. Cl.
  CPC ........ *H01F 30/10* (2013.01); *B32B 2307/206* (2013.01)
(58) Field of Classification Search
  USPC .......................................... 336/219, 205, 61
  See application file for complete search history.

(56) References Cited

U.S. PATENT DOCUMENTS

| | | | | |
|---|---|---|---|---|
| 7,289,329 | B2* | 10/2007 | Chen | H01F 27/2804 165/185 |
| 7,339,208 | B2* | 3/2008 | Brar | H01L 29/1029 257/192 |
| 8,077,475 | B2* | 12/2011 | Otremba | H01L 23/49562 174/200 |
| 8,334,747 | B2* | 12/2012 | Matsumoto | H01F 27/22 336/200 |
| 8,456,263 | B2* | 6/2013 | Salomaki | H01F 27/2847 336/58 |
| 8,674,692 | B2* | 3/2014 | Camp | G01R 33/3858 324/307 |
| 8,847,721 | B2* | 9/2014 | Cooper | H01F 5/06 336/200 |
| 9,251,947 | B2* | 2/2016 | Salomaki | H01F 27/10 |
| 2007/0030659 | A1 | 2/2007 | Suzuki | |
| 2009/0083963 | A1* | 4/2009 | Otremba | H01L 23/49562 29/592.1 |
| 2009/0243781 | A1 | 10/2009 | Nomura et al. | |
| 2011/0109419 | A1* | 5/2011 | Cooper | H01F 5/06 336/206 |
| 2011/0313411 | A1* | 12/2011 | Anderson | A61F 7/00 606/25 |
| 2013/0342303 | A1* | 12/2013 | Mori | H01F 5/06 336/222 |
| 2014/0167901 | A1 | 6/2014 | Persson | |
| 2014/0353000 | A1* | 12/2014 | Yin | H01B 3/04 174/113 R |
| 2016/0351311 | A1* | 12/2016 | Ando | H01F 6/06 |
| 2016/0365164 | A1* | 12/2016 | Fukuda | H01B 3/308 |
| 2017/0025960 | A1* | 1/2017 | Joo | H01F 27/22 |

FOREIGN PATENT DOCUMENTS

| | | | |
|---|---|---|---|
| JP | 2000058314 A | * | 2/2000 |
| JP | 2001118128 A | | 4/2001 |
| JP | 2008-166625 A | | 7/2008 |
| JP | 2009246363 A | | 10/2009 |
| JP | 2014056868 A | | 3/2014 |
| JP | 2014192517 A | | 10/2014 |
| JP | 2015198181 A | | 11/2015 |
| WO | 2016079903 A1 | | 5/2016 |

OTHER PUBLICATIONS

English translation from WIPO of PCT International Search Report for PCT/JP2016/065985 dated Aug. 30, 2016.
PCT Written Opinion for PCT/JP2016/065985 dated Aug. 30, 2016 with machine English translation (OCR by Adobe Acrobat, Google Translate).
From PCT/JP2016/065985, Written Opinion of International Searching Authority, dated Aug. 30, 2016, with English translation from WIPO.
From PCT/JP2016/065985, International Preliminary Report on Patentability, dated Dec. 4, 2018, with English translation from WIPO.
From PCT/JP2016/065987, International Search Report, dated Aug. 30, 2016, with English translation from WIPO.
From PCT/JP2016/065987, Written Opinion of International Searching Authority, dated Aug. 30, 2016, with English translation from WIPO.
From PCT/JP2016/065987, International Preliminary Report on Patentability, dated Dec. 4, 2018, with English translation from WIPO.
From CN201680003068.2A, Office Action, dated Oct. 9, 2018, with English translation from Google Translate.
International Search Report for PCT/JP2016/065985 dated Aug. 30, 2016 and its English machine translation from Bing Translator.
International Search Report for related PCT/JP2016/065987 dated Aug. 30, 2016 and its English machine translation by Google translate.
U.S. Appl. No. 15/510,995, filed Mar. 13, 2017, Koduke Ikeda.

* cited by examiner

COIL STRUCTURE AND MAGNETIC COMPONENT

CROSS-REFERENCE TO RELATED APPLICATION

The present application is the U.S. national phase of PCT Application PCT/JP2016/065985 filed on May 31, 2016, the disclosure of which is incorporated herein by reference in its entirety.

TECHNICAL FIELD

The present invention relates to a coil structure and a magnetic component such as a transformer including the coil structure, an inductance, and a choke coil.

BACKGROUND ART

A transformer used in a magnetic component has been known in the related arts. A known example of such a transformer has one that laminates a plurality of coil substrates, each of which are insulated from each other by an insulating sheet. A related art disclosed in JP 2014-56868 A is one provided with an insulating sheets between a first printed coil substrate and a second printed coil substrate. In a proposal disclosed in JP 2014-56868 A, a conductor including a metal such as cupper (Cu) is buried, in place of the insulating sheet, inside a substrate including an insulating member such as resin having electric insulation properties.

SUMMARY OF INVENTION

Technical Problem

In a case of applying insulating sheets or in a case of burying a conductor in an insulating member, one type of insulating sheets or insulating member has been used. The insulating sheets and insulating member are used so as to secure insulation properties and they are not expected to perform other functions. Therefore, in a case of using one type of insulating sheets having relatively low thermal conductivity or in a case of using one type of insulating sheets having relatively high permittivity, there may be a problem that sufficient radiation properties cannot be achieved. On the other hand, in a case of using one type of insulating sheets having relatively high thermal conductivity or in a case of using one type of insulating sheets having relatively high permittivity, there may be a problem that sufficient insulating effect cannot be achieved.

The present invention has been made in light of such situations and the present invention provides a coil structure and a transformer having sufficient insulation properties and capable of achieving, for example, sufficient radiation properties.

Solution to Problem

A coil structure, according to the present invention, comprises:
a coil including conductors; and
insulating sheets provided between the conductors included in the coil;
wherein two or more insulating sheets are provided,
wherein the two or more insulating sheets have two or more types of insulating sheets having at least different thermal conductivity or different permittivity.

In the coil structure according to the present invention, the two or more insulating sheets may have an low thermal conductivity insulating sheet, and a high thermal conductivity insulating sheet, whose thermal conductivity is higher than thermal conductivity of the low thermal conductivity insulating sheets.

In the coil structure according to the present invention, three or more insulating sheets may be provided, and the number of the high thermal conductivity insulating sheet may be larger than the number of the low thermal conductivity insulating sheet.

In the coil structure according to the present invention, the thermal conductivity of the high thermal conductivity insulating sheet may be twice or more than twice as large as the thermal conductivity of the low thermal conductivity insulating sheet.

In the coil structure according to the present invention, the high thermal conductivity insulating sheet may be disposed in outermost surface.

In the coil structure according to the present invention, three or more insulating sheets may be provided, and the high thermal conductivity insulating sheets may be disposed in a middle part in a thickness direction of the three or more insulating sheets.

In the coil structure according to the present invention, the two or more insulating sheets may have a low permittivity insulating sheet, and a high permittivity insulating sheet, whose permittivity is higher than permittivity of the low permittivity insulating sheet.

In the coil structure according to the present invention, three or more insulating sheets may be provided, and the number of the low permittivity insulating sheet may be larger than the number of the high permittivity insulating sheet.

In the coil structure according to the present invention, a thickness of the high permittivity insulating sheet may be thicker than a thickness of the low permittivity insulating sheet.

In the coil structure according to the present invention, three or more insulating sheets may be provided, the three or more insulating sheets may have a first insulating sheet, a second insulating sheet, and a third insulating sheet, thermal conductivity of the first insulating sheet may be higher than thermal conductivity of the second insulating sheet, and the thermal conductivity of the second insulating sheet may be higher than thermal conductivity of the third insulating sheet.

In the coil structure according to the present invention, three or more insulating sheets may be provided, the three or more insulating sheets may have two low thermal conductivity insulating sheets, and a high thermal conductivity insulating sheet, whose thermal conductivity is higher than thermal conductivity of the low thermal conductivity insulating sheets, the high thermal conductivity insulating sheet may be provided between the two low thermal conductivity insulating sheets
a thickness of a peripheral part of the high thermal conductivity insulating sheet may be thinner than a thickness of a central part of the high thermal conductivity insulating sheet.

In the coil structure according to the present invention, three or more insulating sheets may be provided, the three or more insulating sheets may have two high permittivity insulating sheets and a low permittivity insulating sheet, whose permittivity is lower than permittivity of the high permittivity insulating sheet, the low permittivity insulating sheet may be provided between the two high permittivity insulating sheets, and a thickness of a peripheral part of the low permittivity insulating sheet may be thinner than a thickness of a central part of the low permittivity insulating sheet.

A magnetic component comprises:

a core provided with a leg; and the coil structure, according to the present invention, wrapped around the leg.

Advantageous Effects of Invention

According to the present invention, two or more types of insulating sheets having at least different thermal conductivity or different permittivity are applicable. Therefore, it is possible to achieve, for example, sufficient radiation properties as well as to secure insulation properties

DESCRIPTION OF EMBODIMENTS

First Embodiment (Configuration)

Figure 1:
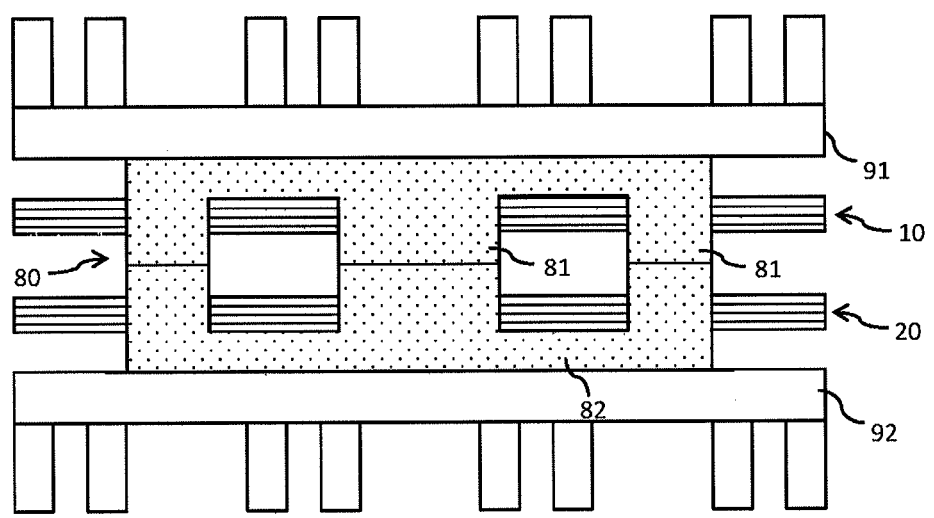
FIG. 1 is a cross sectional side view of a magnetic component according to a first embodiment of the present invention.

As illustrated in FIG. 1, a magnetic component according to the present embodiment has a core 80 provided with a body 82 and legs 81, and a coil structure wrapped around the legs 81. Examples of the magnetic component have a transformer, inductance and choke coil etc. In the present embodiment, a transformer will be hereinafter described as magnetic component, but it should not be restricted thereto.

As illustrated in FIG. 2 to FIG. 13, the coil structure according to the present embodiment has a coil 150 including conductors such as copper, and two or more insulating sheets 100 provided between the conductors included in the coil 150. The two or more insulating sheets 100 have two or more types of insulating sheets 100 having at least different thermal conductivity or different permittivity. The coil 150 is wrapped along an axial line (imaginary straight line) and surfaces of the insulating sheets 100 are provided with through-holes (not illustrated) so that the wrapped coil 150 passes therethrough.

The magnetic component according to the present embodiment has radiators 91, 92 such as radiating fins brought into contact with end surfaces of the core 80.

In an aspect illustrated in FIG. 1, the radiators 91, 92 has a first radiator 91 brought into contact with a first end surface of the core 80 (an end surface in an upper part of FIG. 1) and a second radiator 92 brought into contact with a second end surface of the core 80 (an end surface in the lower part of FIG. 1).

The coil structure has a first coil structure and a second coil structure provided separately from the first coil structure. Each of the first coil structure and second coil structure has the coil 150 and the two or more insulating sheets 100. In the aspect illustrated in FIG. 1, the first coil structure is included in a primary coil 10, while the second coil structure is included in a secondary coil 20.

Figure 22:
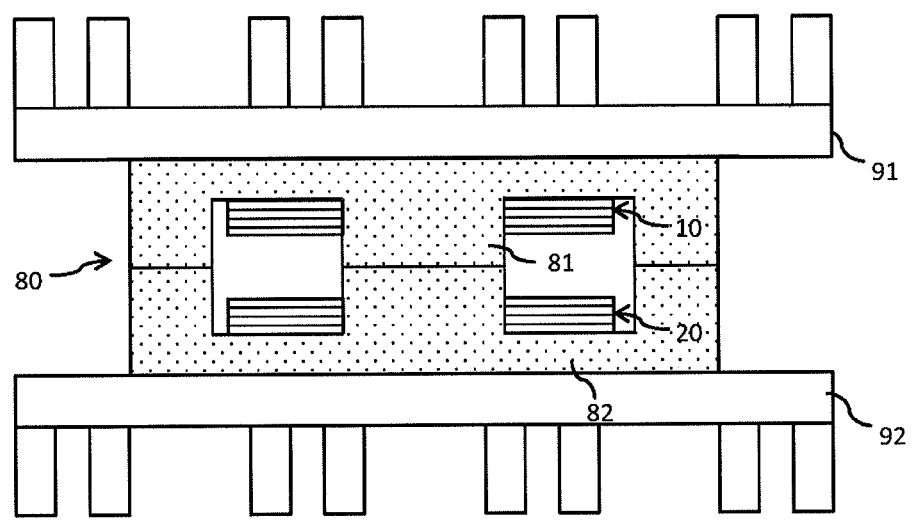
FIG. 22 is a cross sectional side view illustrating another example of the magnetic component applicable to the embodiment of the present invention.

As illustrated in FIG. 1, the transformer according to the present embodiment has the primary coil 10 and secondary coil 20. Each of the primary coil 10 and secondary coil 20 is wrapped around the legs 81 of the core 80. In the aspect illustrated in FIG. 1, two primary coils 10 and two secondary coils 20 are provided, but the present embodiment should not be restricted to such an aspect. The present embodiment may also apply an aspect in which one primary coil 10 and one secondary coil 20 are provided or an aspect in which three or more primary coils 10 and three or more secondary coils 20 are provided. Unless otherwise specified, the primary coil 10 and secondary coil 20 will be hereinafter described without being distinguished. The aspect of the present embodiment may be applicable to the primary coil (that is, the first coil structure) 10 or to the secondary coil 20 (that is, the second coil structure) or to each of the primary coil 10 and secondary coil 20. In regard to an aspect in which one primary coil 10 and one secondary coil 20 are provided, it should be noted that an aspect illustrated in FIG. 22, for example, is applicable.

The two or more insulating sheets 100 may also have low thermal conductivity insulating sheets 120, and high thermal conductivity insulating sheets, whose thermal conductivity is higher than that of the low thermal conductivity insulating sheets 120. It should be noted that each of the high thermal conductivity insulating sheets 110 has fillers. Due to the fillers, the insulating sheets 110 may be configured to have the thermal conductivity higher than that of the low thermal conductivity insulating sheets 120. Furthermore, each of the high thermal conductivity insulating sheets 110 and low thermal conductivity insulating sheets 120 may have fillers. Due to, for example, different properties, orientations, contents of the fillers, the high thermal conductivity insulating sheets 110 may be configured to have the thermal conductivity higher than that of the low thermal conductivity insulating sheets 120.

In general, in a case of using fillers including ceramic such as boron nitride and silicon nitride or ceramic-like materials, it is possible to enhance permittivity as well as thermal conductivity. On the other hand, in a case of using fillers including silicon, acryl, and the like, it is possible to lower the permittivity as well as the thermal conductivity. Furthermore, in a case of using fillers including metallic materials, it is possible to enhance the thermal conductivity and to lower the permittivity.

In a case where three or more insulating sheets 100 are provided, the number of the high thermal conductivity insulating sheets 110 may be larger than that of the low thermal conductivity insulating sheets 120. However, the number of those insulating sheets should not be restricted and the number of the low thermal conductivity insulating sheets 120 may be larger than that of the high thermal conductivity insulating sheets 110.

The thermal conductivity of the high thermal conductivity insulating sheets 110 may be twice or more than twice as large as that of the low thermal conductivity insulating sheets 120. Alternatively, the thermal conductivity of the insulating sheets 110 may be further larger, for example, ten times or more than ten times as large as that of the low thermal conductivity insulating sheets 120.

Figure 2:
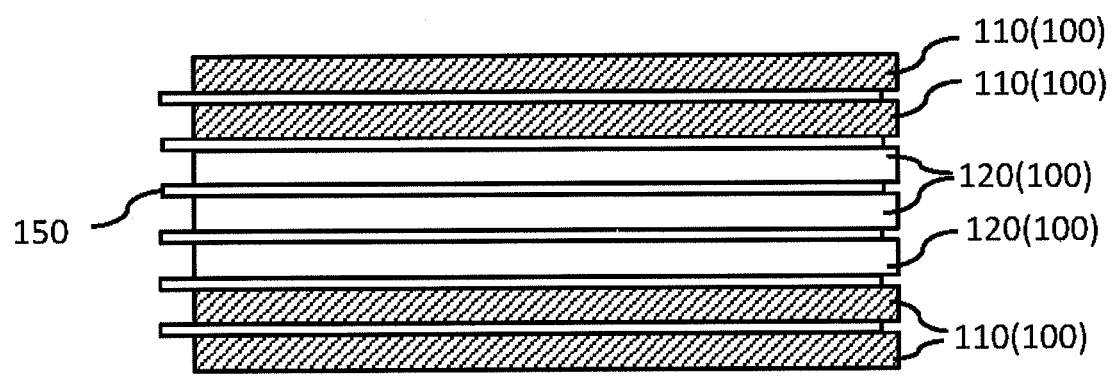
FIG. 2 is a cross sectional side view illustrating an aspect 1 of a coil structure applicable to the first embodiment of the present invention.
Figure 3:
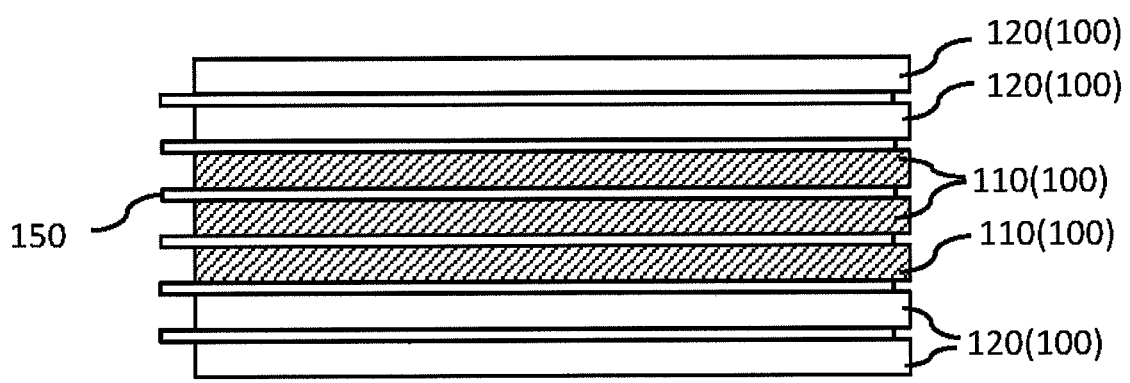
FIG. 3 is a cross sectional side view illustrating an aspect 2 of the coil structure applicable to the first embodiment of the present invention.
Figure 4:
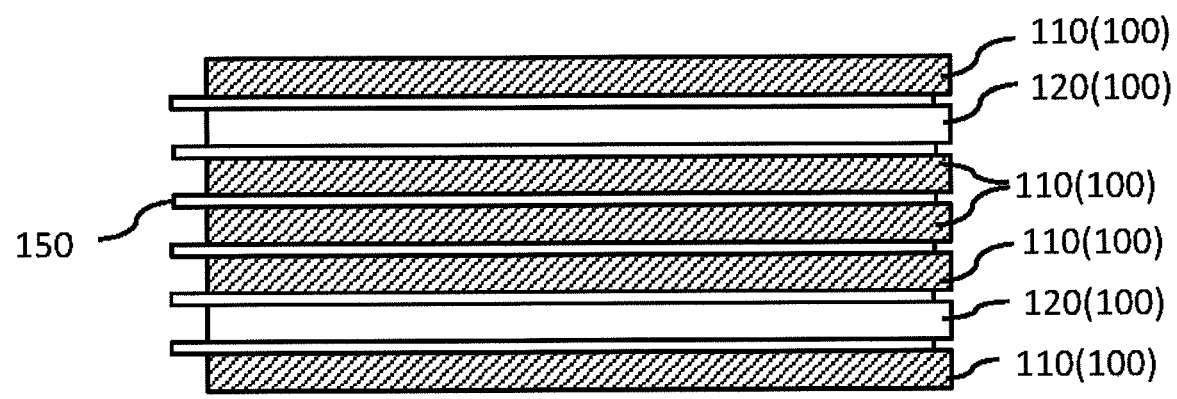
FIG. 4 is a cross sectional side view illustrating an aspect 3 of the coil structure applicable to the first embodiment of the present invention.
Figure 5:
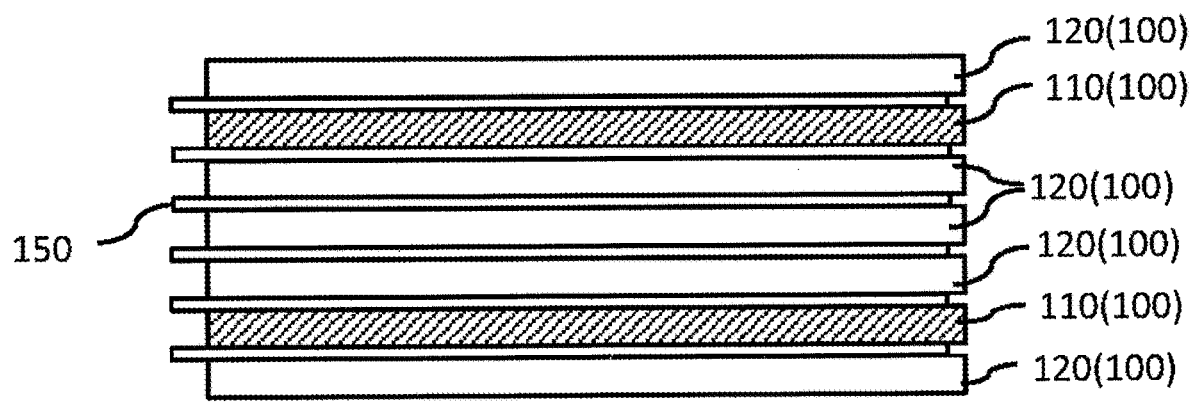
FIG. 5 is a cross sectional side view illustrating an aspect 4 of the coil structure applicable to the first embodiment of the present invention.
Figure 6:
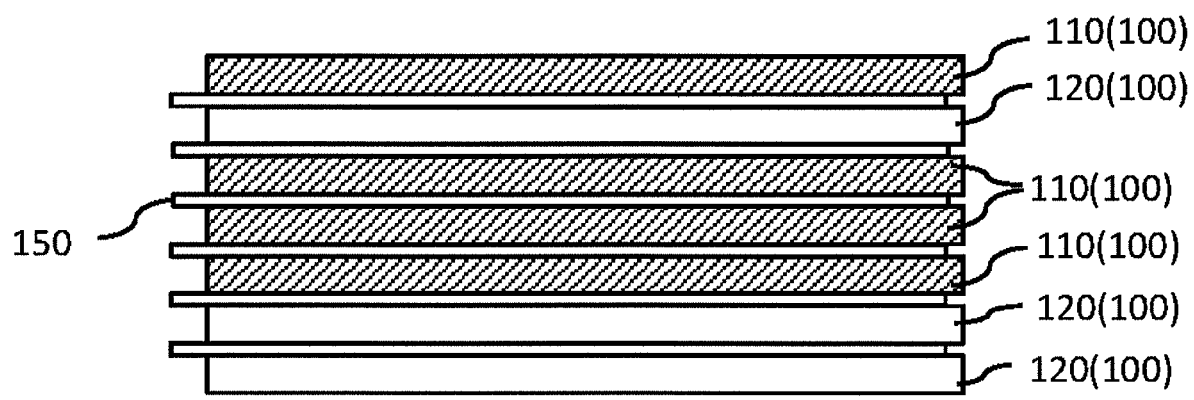
FIG. 6 is a cross sectional side view illustrating an aspect 5 of the coil structure applicable to the first embodiment of the present invention.
Figure 7:
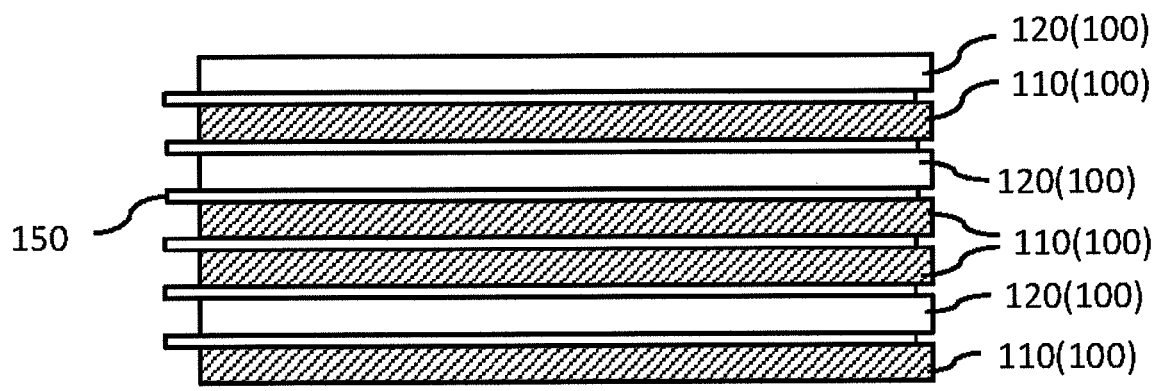
FIG. 7 is a cross sectional side view illustrating an aspect 6 of the coil structure applicable to the first embodiment of the present invention.

As illustrated in FIG. 2 and FIG. 4, the high thermal conductivity insulating sheets 110 may be disposed in outermost surfaces of both ends of a plurality of insulating sheets 100. However, the configuration should not be restricted to such an aspect and the low thermal conductivity insulating sheets 120 may be disposed in the outermost surfaces of the both ends of the plurality of insulating sheets 100 as illustrated in FIG. 3 and FIG. 5. Furthermore, as illustrated in FIG. 6 and FIG. 7, the high thermal conductivity insulating sheets 110 and low thermal conductivity insulating sheets 120 may not be disposed symmetrically with respect to a surface perpendicular to the axial line of the coil 150. For example, an high thermal conductivity insulating sheet 110 may be disposed in an outermost surface of a body 82 side of the core 80, while an low thermal conductivity insulating sheet 120 may be disposed in an outermost surface of an opposing side of the body 82 of the core 80. Alternatively, an low thermal conductivity insulating sheet 120 may be disposed in the outermost surface of the body 82 side of the core 80, while an high thermal conductivity insulating sheet 110 may be disposed in the outermost surface of the opposing side of the body 82 of the core 80.

As illustrated in FIG. 3, FIG. 4, FIG. 6, and FIG. 7, the high thermal conductivity insulating sheets 110 may also be disposed in a middle part in a thickness direction of the three or more insulating sheets 100. The middle part herein represents a substantially half position in regard to the number of the three or more insulating sheets 100. For example, when the number of the plurality of insulating sheets 100 is even (no pieces), $n_0/2$ or $n_0/2+1$ will be the middle part. Alternatively, when the number of the plurality of insulating sheets 100 is odd ($n_1$ pieces), $(n_1+1)/2$ will be the middle part. Specifically, when the number of the plurality of insulating sheets 100 is six, third sheet or fourth sheet will be the middle part. When the number of the plurality of insulating sheets 100 is seven, fourth sheet will be the middle part.

As illustrated in FIG. 4, FIG. 6, and FIG. 7, the high thermal conductivity insulating sheets 110 may be disposed in the middle part in the thickness direction of the three or more insulating sheets 100 as well as in the outermost surface(s).

The two or more insulating sheets 100 may also have low permittivity insulating sheets 130, and high permittivity insulating sheets 140, whose permittivity is higher than that of the low permittivity insulating sheets 130. It should be noted that each of the low permittivity insulating sheets 130 has fillers. Due to the fillers, the insulating sheets 130 may be configured to have the permittivity lower than that of the high permittivity insulating sheets 140. Furthermore, each of the low permittivity insulating sheets 130 and high permittivity insulating sheets 140 may have fillers. Due to each of the insulating sheets having, for example, different properties and contents of the fillers, the low permittivity insulating sheets 130 may be configured to have thermal permittivity lower than the permittivity of the high permittivity insulating sheets 140.

In a case where three or more insulating sheets 100 are provided, the number of the low permittivity insulating sheets 130 may be larger than that of the high permittivity insulating sheets 140. However, the number of those insulating sheets should not be restricted and the number of the low permittivity insulating sheets 130 may be larger than that of the high permittivity insulating sheets 140.

The permittivity of the high permittivity insulating sheets 140 may be twice or more than twice as large as that of the low permittivity insulating sheets 130.

Figure 8:
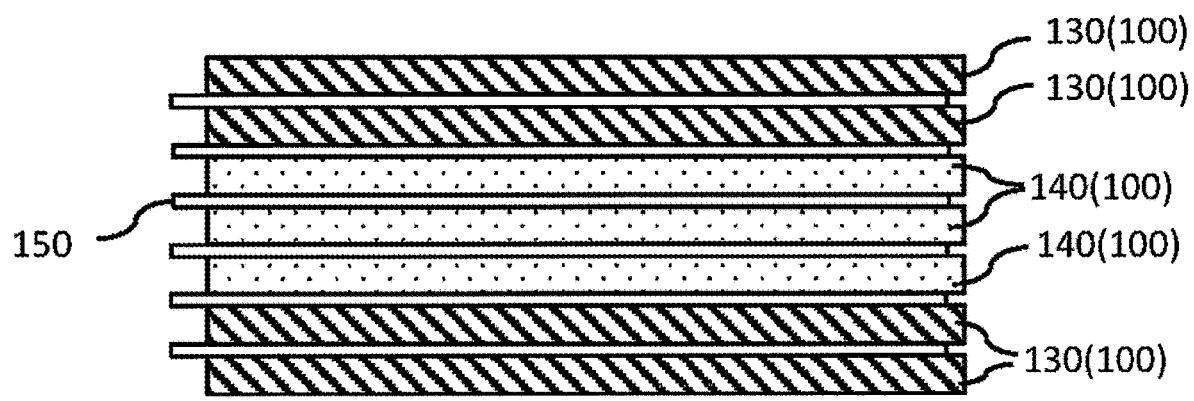
FIG. 8 is a cross sectional side view illustrating an aspect 7 of the coil structure applicable to the first embodiment of the present invention.
Figure 9:
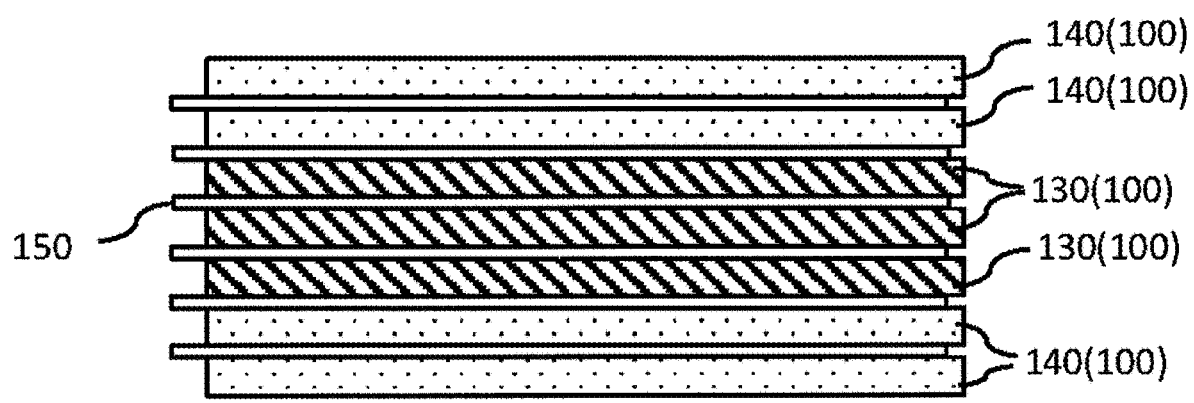
FIG. 9 is a cross sectional side view illustrating an aspect 8 of the coil structure applicable to the first embodiment of the present invention.
Figure 10:
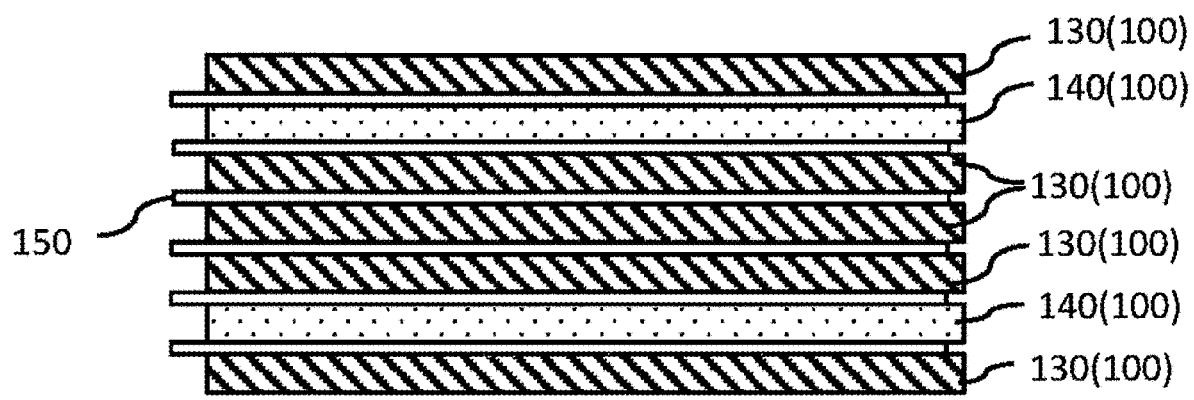
FIG. 10 is a cross sectional side view illustrating an aspect 9 of the coil structure applicable to the first embodiment of the present invention.
Figure 11:
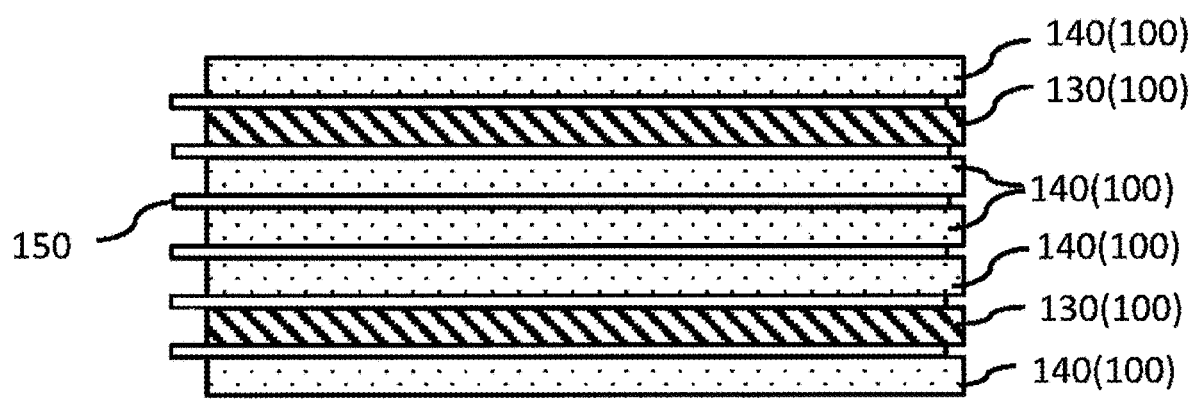
FIG. 11 is a cross sectional side view illustrating an aspect 10 of the coil structure applicable to the first embodiment of the present invention.
Figure 12:
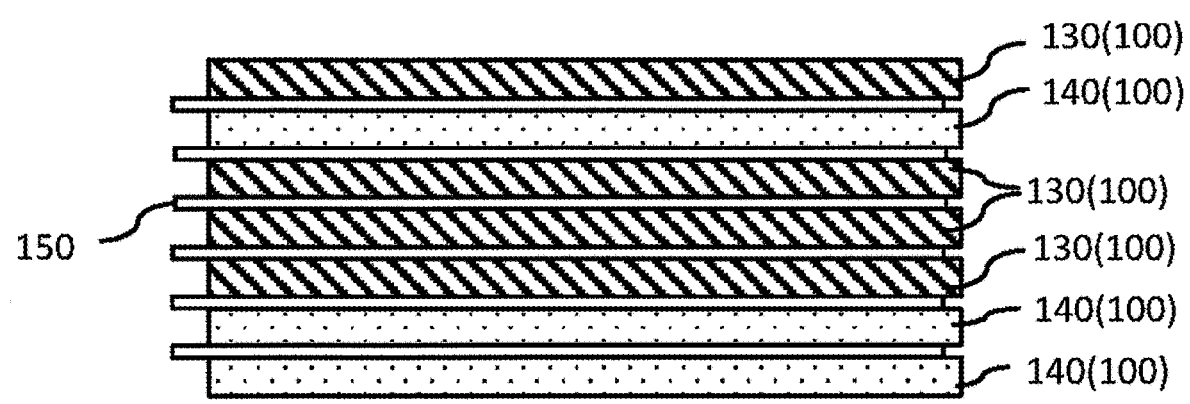
FIG. 12 is a cross sectional side view illustrating an aspect 11 of the coil structure applicable to the first embodiment of the present invention.
Figure 13:
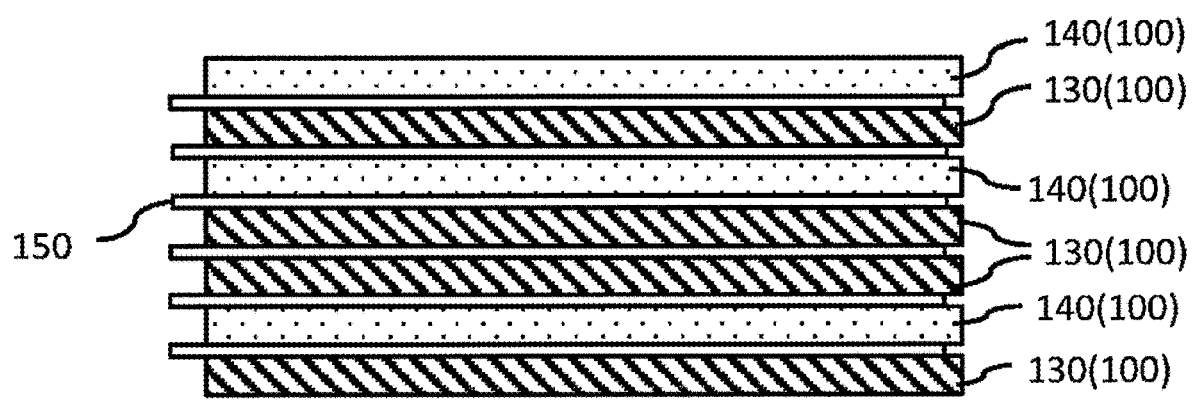
FIG. 13 is a cross sectional side view illustrating an aspect 12 of the coil structure applicable to the first embodiment of the present invention.

As illustrated in FIG. 8 and FIG. 10, the low permittivity insulating sheets 130 may be disposed in outermost surfaces of both ends of the plurality of insulating sheets 100. However, the configuration should not be restricted to such an aspect and the high permittivity insulating sheets 140 may be disposed in the outermost surfaces of the both ends of the plurality of insulating sheets 100 as illustrated in FIG. 9 and FIG. 11. Furthermore, as illustrated in FIG. 12 and FIG. 13, the low permittivity insulating sheets 130 and high permittivity insulating sheets 140 may not be disposed symmetrically with respect to the surface perpendicular to the axial line of the coil 150. For example, an low permittivity insulating sheet 130 may be disposed in the outermost surface of the body 82 side of the core 80, while an high permittivity insulating sheet 140 may be disposed in the outermost surface of the opposing side of the body 82 of the core 80. Alternatively, an high permittivity insulating sheet 140 may be disposed in the outermost surface of the body 82 side of the core 80, while an low permittivity insulating sheet 130 may be disposed in the outermost surface of the opposing side of the body 82 of the core 80.

As illustrated in FIG. 9, FIG. 10, FIG. 12, and FIG. 13, the low permittivity insulating sheets 130 may also be disposed in the middle part in the thickness direction of the three or more insulating sheets 100.

As illustrated in FIG. 10, FIG. 12, and FIG. 13, the low permittivity insulating sheets 130 may be disposed in the middle part in the thickness direction of the three or more insulating sheets 100 as well as in the outermost surface(s).

(Functions and Effects)

Hereinafter, functions and effects obtained from the present embodiment including the abovementioned configuration will be described focusing on those not mentioned yet. It should be noted that an aspect described in "Functions and Effects" is applicable to the abovementioned "Configuration".

According to the present embodiment, two or more types of insulating sheets 100 having at least different thermal conductivity or different permittivity are applicable. Therefore, it is possible to achieve, for example, sufficient radiation properties as well as to secure insulation properties (to achieve high voltage endurance).

In a case of adopting an aspect in which a plurality of low thermal conductivity and high permittivity insulating sheets are applied, heat generated from the coil 150 cannot be sufficiently radiated, and in a case of using the coil 150 with high frequency, a skin effect will occur. As a result, it is undeniable that the coil 150 will reach such a high temperature that its properties deteriorate and that the transformer malfunctions.

In view of such a respect, when thicknesses of the low thermal conductivity and high permittivity insulating sheets are made thin in order to enhance the radiation properties, voltage endurance may not be sufficient and a rush current may occur between conductors adjacent in the axial line direction included in the coil 150. Such phenomena may cause a serious damage.

In this respect, the present embodiment applies two or more types of insulating sheets 100 having at least different thermal conductivity or different permittivity. Therefore, for example, the radiation properties may be enhanced by the insulating sheets 100 having high thermal conductivity, and the voltage endurance may be enhanced by the insulating sheets 100 having low thermal conductivity. Furthermore, for example, an occurrence of the skin effect can be prevented by the insulating sheets 100 having low permittivity, and therefore the generation of heat can be prevented. The voltage endurance can be enhanced by the insulating sheets 100 having high permittivity.

In a case of adopting an aspect in which the two or more insulating sheets 100 have the low thermal conductivity insulating sheets 120 and high thermal conductivity insulating sheets 110, the high thermal conductivity insulating sheets 110 conduct the heat efficiently, so that the heat generated in the coil 150 may be easily radiated. It is generally said that the higher the thermal conductivity, the lower the insulation properties, and the lower the thermal conductivity, the higher the insulation properties. This aspect adopts the low thermal conductivity insulating sheets 120, so that it is possible to secure high insulation properties by the low thermal conductivity insulating sheets 120.

In a case of adopting an aspect in which three or more insulating sheets 100 are provided and the number of the high thermal conductivity insulating sheets 110 is larger than the number of the low thermal conductivity insulating sheets 120, it is possible to accelerate radiation by the high thermal conductivity insulating sheets 110 which is larger in number and to secure high insulation properties by the low thermal conductivity insulating sheets 120.

By adopting the aspect in which the thermal conductivity of the high thermal conductivity insulating sheets 110 is twice or more than twice as large as that of the low thermal conductivity insulating sheets 120, it is possible to conduct the heat efficiently. By adopting the aspect in which the thermal conductivity of the high thermal conductivity insulating sheets 110 is ten times or more than ten times as large as that of the low thermal conductivity insulating sheets 120, it is possible to conduct the heat further efficiently.

By disposing the high thermal conductivity insulating sheets 110 in the outermost surface (s), the heat can be radiated outside through the high thermal conductivity insulating sheets 110, so that high radiation properties can be expected.

Furthermore, the high thermal conductivity insulating sheets 110 may also be disposed in the middle part in the thickness direction of the plurality of insulating sheets 100. The reason is that the heat generated from the coil 150 can be apt to accumulate in the middle part, but the accumulating heat can be efficiently conducted by adopting the high thermal conductivity insulating sheets 110.

In a case of adopting an aspect in which the two or more insulating sheets 100 have the low permittivity insulating sheets 130 and high permittivity insulating sheets 140, and even when adopting high frequency such as MHz or GHz, it is possible to make influences of the high frequency small. This respect will be hereinafter explained. In a case of adopting high frequency, there is a possibility that the skin effect occurs, so that electric currents flow solely on surfaces. This skin effect further intensifies resistance (for example, a resistance value will be ten times or more), so that the heat will be generated more. Furthermore, in a case of adopting the high frequency, there is a possibility that a dielectric loss tangent becomes large.

The permittivity ε will be represented by ε=δD/δE (where D is electric flux density, and E is intensity of an electric field). In a case of adopting the plurality of insulating sheets 100, the permittivity thereof will be a sum of the permittivity of each insulating sheets 100. However, when the insulating sheets 100 having low permittivity (an low permittivity insulating sheet 130) are included, the permittivity will be greatly influenced by the insulating sheets 100 having low permittivity. In other words, due to the insulating sheets 100 having low permittivity, it is possible to reduce influences caused by the skin effect when adopting the high frequency and it is possible to prevent the dielectric loss tangent from becoming large.

Therefore, in a case of adopting the aspect in which the two or more insulating sheets 100 have the low permittivity insulating sheets 130, it is possible to reduce the influences caused by the skin effect and to prevent the dielectric loss tangent from becoming large.

Furthermore, a capacity C is represented by $C=\varepsilon \times S/d$ (where S is a surface area of a certain surface, and d is a thickness of the certain surface). Therefore, the insulating sheets 100 having large permittivity $\varepsilon$ can also reduce the capacity C by thickening each thickness thereof. Accordingly, for example, each thickness of the high permittivity insulating sheets 140 may be made thicker than that of the low permittivity insulating sheets 130. Supposed that the permittivity of each high permittivity insulating sheet 140 is $\varepsilon_0$ and the permittivity of each low permittivity insulating sheet 130 is $\varepsilon_1$. For example, a thickness of each low permittivity insulating sheet 130/a thickness of each high permittivity insulating sheet 140 may be equal to $\varepsilon_0/\varepsilon_1$. Alternatively, the thickness of each low permittivity insulating sheet 130/the thickness of each high permittivity insulating sheet 140 may be equal to $\varepsilon_0/\varepsilon_1 \pm 0.30 \times \varepsilon_0/\varepsilon_1$. Due to such thicknesses, even when there is a difference in the permittivity, it is useful in that values of the capacity can be made substantially equivalent.

In a case of adopting an aspect in which the number of the low permittivity insulating sheets 130 is larger than that of the high permittivity insulating sheets 140, and even when the high frequency is adopted, the low permittivity insulating sheets 130 which is larger in number can surely reduce the influences caused by the skin effect and they can surely prevent the dielectric loss tangent from becoming large. Furthermore, by making the number of the low permittivity insulating sheets 130 large, it is useful in that the capacity of the entire insulating sheets 100 can be made small (it is useful especially when adopting the high frequency).

It should be noted that it is relatively easy to enhance the voltage endurance by thickening each thickness of the insulating sheets 100. Therefore, even when making the number of the high thermal conductivity insulating sheets 110 large or making the number of the low permittivity insulating sheets 130 large, it is possible to prevent the voltage endurance from falling excessively by maintaining total thicknesses of those insulating sheets to a certain extent.

Second Embodiment

Hereinafter, a second embodiment of the present invention will be described.

In the present embodiment, three or more insulating sheets 100 are provided and the three or more insulating sheets 100 have first insulating sheet(s) 160, second insulating sheet(s) 170, and third insulating sheet(s) 180. Thermal conductivity of each first insulating sheet 160 is higher than that of each second insulating sheet 170, and the thermal conductivity of each second insulating sheet 170 is higher than that of each third insulating sheet 180.

A relationship between the high thermal conductivity insulating sheets 110 and low thermal conductivity insulating sheets 120 and a relationship between the low permittivity insulating sheets 130 and high permittivity insulating sheets 140 are relative in the first embodiment. Therefore, for example, it can happen that the low thermal conductivity insulating sheets 120 and high permittivity insulating sheets 140 are identical. Similarly, it can happen that the high thermal conductivity insulating sheets 110 and low permittivity insulating sheets 130 may also be identical. In aspects illustrated in FIG. 14 to FIG. 18, for example, the low thermal conductivity insulating sheets 120 and high permittivity insulating sheets 140 are identically illustrated as third insulating sheets 180, and the high thermal conductivity insulating sheets 110 are used as first insulating sheets 160 and the low permittivity insulating sheets 130 are used as second insulating sheets 170.

In the second embodiment, other configurations are substantially similar to that of the first embodiment.

Figure 14:
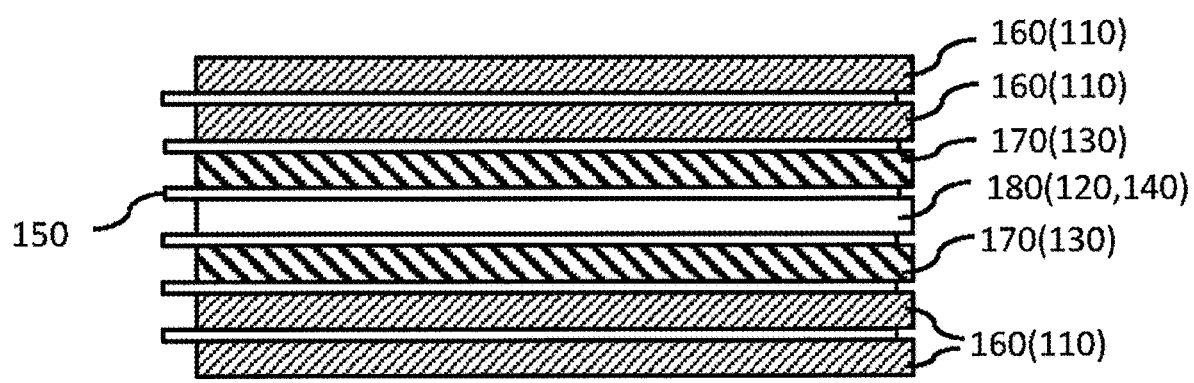
FIG. 14 is a cross sectional side view illustrating an aspect 1 of a coil structure applicable to a second embodiment of the present invention.

As illustrated in FIG. 14, the first insulating sheets 160 may be disposed in outermost surfaces, and the third insulating sheet 180 may be disposed in a middle part of a coil 150, and the second insulating sheets 170 may be disposed between the first insulating sheets 160 and the third insulating sheet 180. In a case of adopting such an aspect, it is useful in that a cooling effect from outside can be given toward the middle part of the coil 150 from the insulating sheets, which are disposed in descending order of the thermal conductivity.

Figure 15:
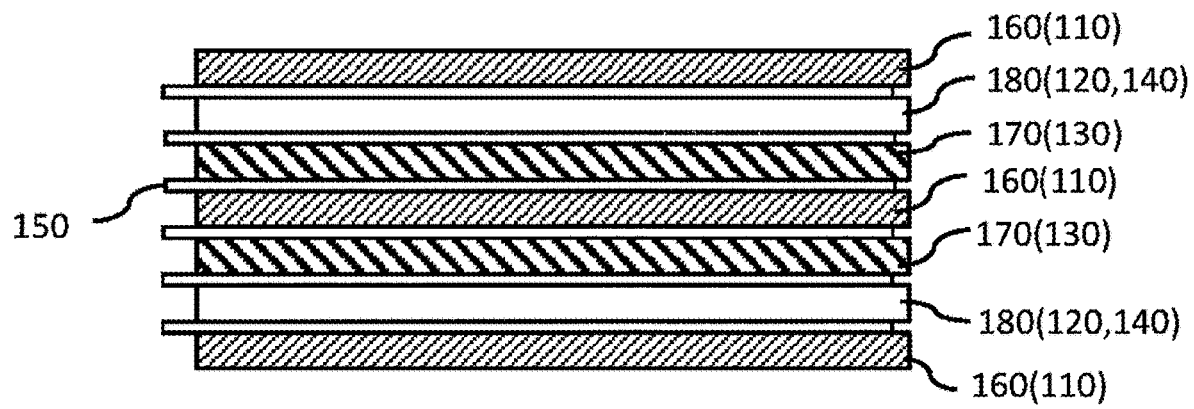
FIG. 15 is a cross sectional side view illustrating an aspect 2 of the coil structure applicable to the second embodiment of the present invention.

As illustrated in FIG. 15, the first insulating sheets 160 may be disposed in the middle part as well as in the outermost surfaces and the second insulating sheets 170 and third insulating sheets 180 may be disposed therebetween. In a case of adopting such an aspect, it is useful in that the cooling effect from outside can be given by the first insulating sheets 160 having high thermal conductivity and the heat from the middle part of the coil 150, where the heat is apt to accumulate, can be conducted by the first insulating sheets 160.

Figure 16:
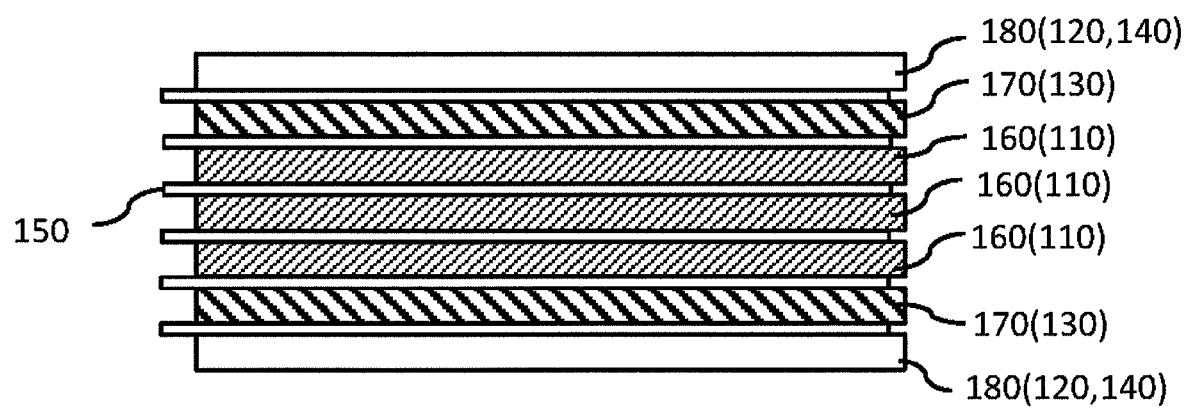
FIG. 16 is a cross sectional side view illustrating an aspect 3 of the coil structure applicable to the second embodiment of the present invention.

As illustrated in FIG. 16, the third insulating sheets 180 may be disposed in the outermost surfaces, and the first insulating sheets 160 may be disposed in the middle part, and the second insulating sheets 170 may be disposed between the first insulating sheets 160 and third insulating sheets 180. In such a case, it is useful in that the heat from the middle part of the coil 150, where the heat is apt to accumulate, can be efficiently conducted by the first insulating sheets 160.

Even in the present embodiment, at least two types of the insulating sheets among the first insulating sheets 160, second insulating sheets 170, and third insulating sheets 180 may have different thicknesses. The thicknesses may be determined based on the permittivity. An insulating sheet 100 having high permittivity may have a thicker thickness and the insulating sheet 100 having low permittivity may have a thinner thickness. For example, supposed that the permittivity of each first insulating sheet 160 is $\varepsilon_2$, the permittivity of each second insulating sheet 170 is $\varepsilon_3$, and the permittivity of each third insulating sheet 180 is $\varepsilon_4$, the thickness of each second insulating sheet 170/the thickness of each first insulating sheet 160 may be equal to $\varepsilon_2/\varepsilon_3 \pm 0.30 \times \varepsilon_2/\varepsilon_3$, or the thickness of each third insulating sheet 180/the thickness of each second insulating sheet 170 may be equal to $\varepsilon_3/\varepsilon_4 \pm 0.30 \times \varepsilon_3/\varepsilon_4$. Due to such thicknesses, even when there is a difference in the permittivity, it is useful in that values of the capacity can be made substantially equivalent.

Figure 17:
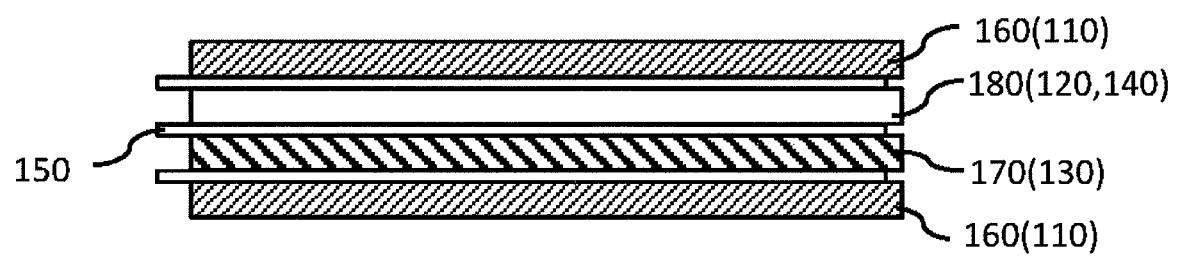
FIG. 17 is a cross sectional side view illustrating an aspect 1 of a coil structure applicable to another embodiment of the present invention.
Figure 18:
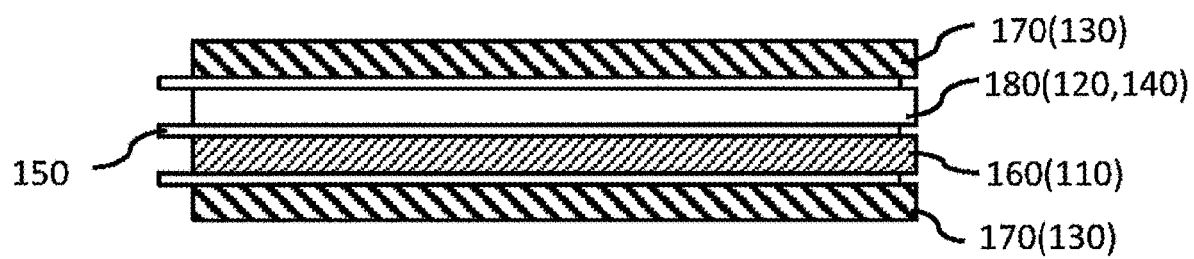
FIG. 18 is a cross sectional side view illustrating an aspect 2 of the coil structure applicable to another embodiment of the present invention.

The number of the insulating sheets should not be restricted to six or seven, and it may be more or less, for example, two to five, or even one hundred. For example, as illustrated in FIG. 17, the first insulating sheets 160 may be provided to both ends of the outermost surfaces and the second insulating sheet 170 and the third insulating sheet 180 may be provided between the both ends. Alternatively, as illustrated in FIG. 18, the second insulating sheets 170 may be provided to the both ends of the outermost surfaces and the first insulating sheet 160 and the third insulating sheet 180 may be provided between the both ends.

Third Embodiment

Hereinafter, a third embodiment of the present invention will be described.

In the present embodiment, three or more insulating sheets 100 are provided between conductors included in a coil 150. The three or more insulating sheets 100 may have two low thermal conductivity insulating sheets 120 and a high thermal conductivity insulating sheet 110, whose thermal conductivity is higher than that of the low thermal conductivity insulating sheets 120. The high thermal conductivity insulating sheet 110 may be provided between the two low thermal conductivity insulating sheets 120. A thickness of a peripheral part of the high thermal conductivity insulating sheet 110 may be thinner than a thickness of a central part of the high thermal conductivity insulating sheet 110.

In the present embodiment, the three or more insulating sheets 100 may also have two high permittivity insulating sheets 140 and an low permittivity insulating sheet 130, whose permittivity is lower than that of the high permittivity insulating sheets 140. The low permittivity insulating sheet 130 may be provided between the two high permittivity insulating sheets 140. A thickness of a peripheral part of the low permittivity insulating sheet 130 may be thinner than a thickness of a central part of the low permittivity insulating sheet 130.

In the third embodiment, other configurations are substantially similar to that of the first embodiment.

Figure 19:
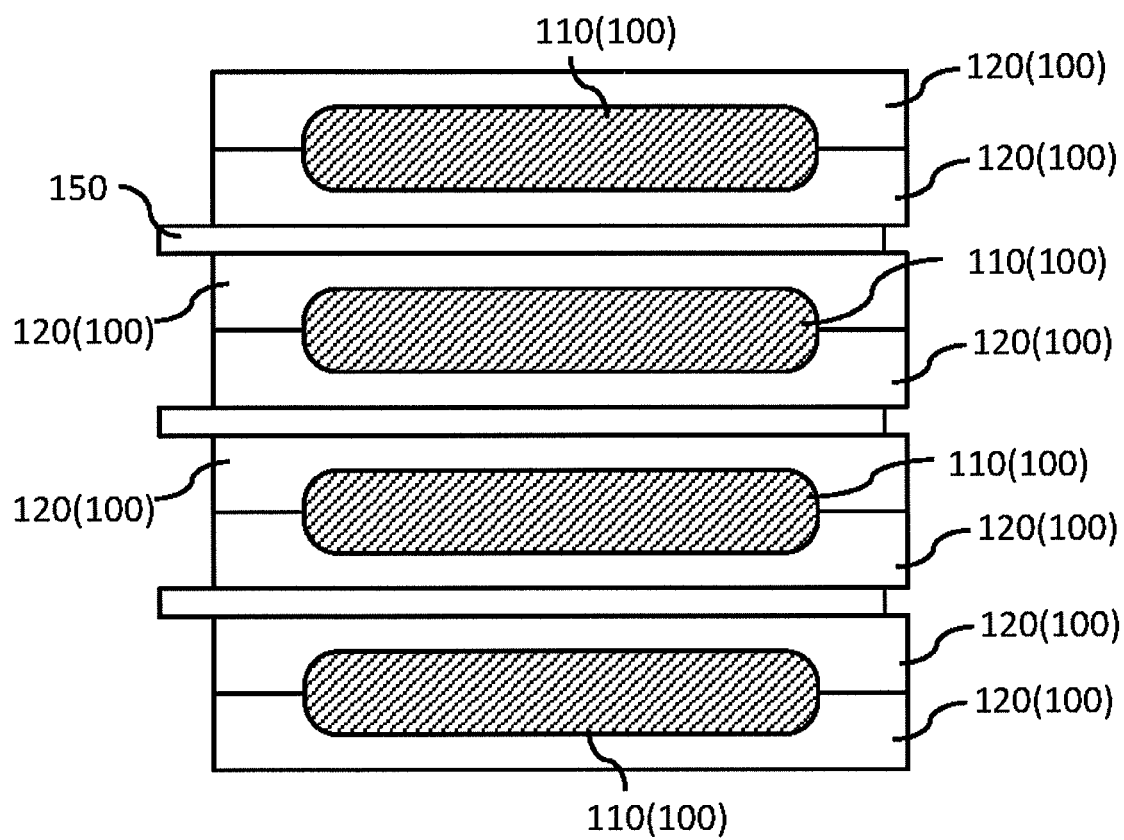
FIG. 19 is a cross sectional side view illustrating an aspect 1 of a coil structure applicable to a third embodiment of the present invention.

An example of the present embodiment has two low thermal conductivity insulating sheets 120 and one high thermal conductivity insulating sheet 110 provided between each of the conductors included in the coil 150, as illustrated in FIG. 19. The thickness of the central part of the high thermal conductivity insulating sheet 110 may be thicker than that of the peripheral part. In an extreme case, the peripheral part may have no high thermal conductivity insulating sheet 110 (thickness may be "zero").

Figure 20:
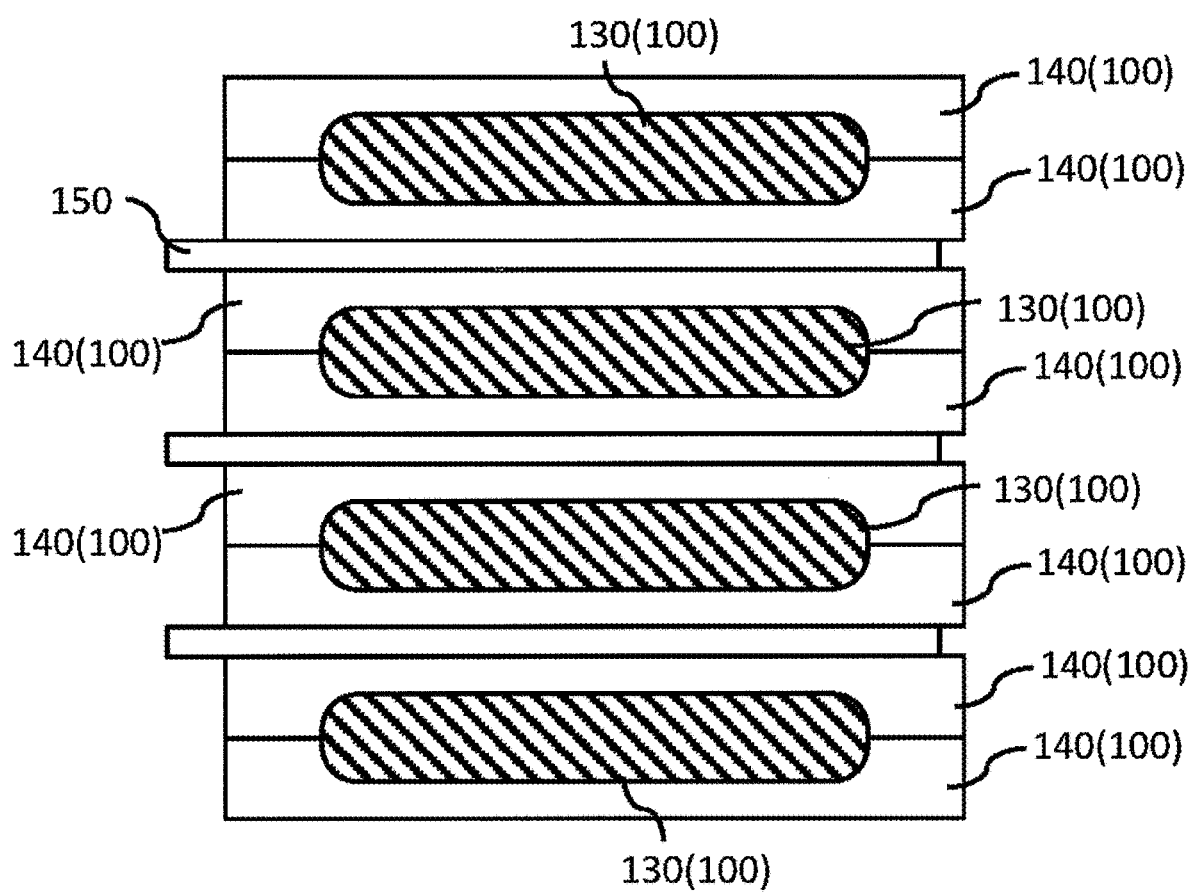
FIG. 20 is a cross sectional side view illustrating an aspect 2 of the coil structure applicable to the third embodiment of the present invention.

Another example of the present embodiment has two high permittivity insulating sheets 140 and one low permittivity insulating sheet 130 provided between each of the conductors included in the coil 150, as illustrated in FIG. 20. The thickness of the central part of the low permittivity insulating sheet 130 may be thicker than that of the peripheral part. In an extreme case, the peripheral part may have no low permittivity insulating sheet 130 (thickness may be "zero").

Figure 21:
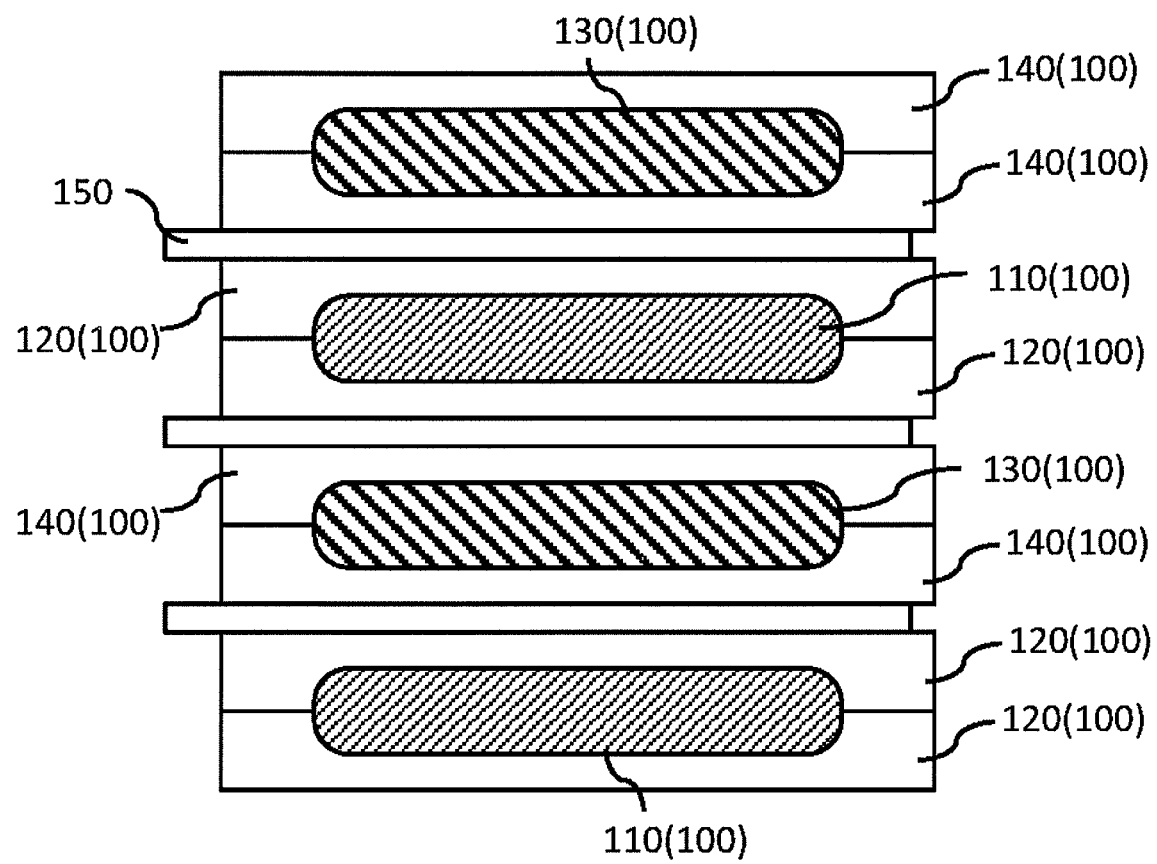
FIG. 21 is a cross sectional side view illustrating an aspect 3 of the coil structure applicable to the third embodiment of the present invention.

Still another example of the present embodiment has two high permittivity insulating sheets 140 and one low permittivity insulating sheet 130, or two low thermal conductivity insulating sheets 120 and one high thermal conductivity insulating sheet 110 provided between each of the conductors included in the coil 150, as illustrated in FIG. 21.

From a point of view of standards for safety, beyond a certain distance (for example, 0.4 mm) from the peripheral part, the high thermal conductivity insulating sheet 110 or low permittivity insulating sheet 130 should not be used or the thicknesses thereof may be necessarily made thin. In this respect, according to the present embodiment, it is useful in that the standards for safety can be satisfied and that the thermal conduction properties can be enhanced or the permittivity can be made low.

Description of each of the abovementioned embodiments and disclosure of the drawings are for exemplary purposes so as to illustrate the present invention described in the claims. The present invention described in the claims should not be restricted to the description of each of the abovementioned embodiments or the disclosure of the drawings.

REFERENCE SIGNS LIST

80 CORE
110 HIGH THERMAL CONDUCTIVITY INSULATING SHEET (INSULATING SHEET)
120 LOW THERMAL CONDUCTIVITY INSULATING SHEET (INSULATING SHEET)
130 LOW PERMITTIVITY INSULATING SHEET (INSULATING SHEET)
140 HIGH PERMITTIVITY INSULATING SHEET (INSULATING SHEET)
150 COIL
160 FIRST INSULATING SHEET (INSULATING SHEET)
170 SECOND INSULATING SHEET (INSULATING SHEET)
180 THIRD INSULATING SHEET (INSULATING SHEET)

What is claimed is:

1. A coil structure comprising:
   a coil including conductors; and
   three or more insulating sheets provided between the conductors included in the coil;
   (1) wherein the three or more insulating sheets have two low thermal conductivity insulating sheets, and a high thermal conductivity insulating sheet, whose thermal conductivity is higher than thermal conductivity of the low thermal conductivity insulating sheets, and
      wherein the high thermal conductivity insulating sheet is provided between the two low thermal conductivity insulating sheets at a central part, and the two low thermal conductivity insulating sheets contact with each other at a peripheral part and the high thermal conductivity insulating sheet does not exist at the peripheral part; or
   (2) wherein the three or more insulating sheets have two high permittivity insulating sheets and a low permittivity insulating sheet, whose permittivity is lower than permittivity of the high permittivity insulating sheets,
      wherein the low permittivity insulating sheet is provided between the two high permittivity insulating sheets at a central part, and the two high permittivity insulating sheets contact with each other at a peripheral part and the low permittivity insulating sheet does not exist at the peripheral part.

2. The coil structure according to claim 1,
   wherein the insulating sheets has the low thermal conductivity insulating sheets and the high thermal conductivity insulating sheet, and
   wherein the thermal conductivity of the high thermal conductivity insulating sheet is twice or more than twice as large as the thermal conductivity of the low thermal conductivity insulating sheet.

3. The coil structure according to claim 1,
   wherein the insulating sheets has the low permittivity insulating sheet and the high permittivity insulating sheets, and
   wherein a thickness of the high permittivity insulating sheet is thicker than a thickness of the low permittivity insulating sheet.

4. The coil structure according to claim 1
   wherein the insulating sheets have a first insulating sheet, a second insulating sheet, and a third insulating sheet,
   wherein thermal conductivity of the first insulating sheet is higher than thermal conductivity of the second insulating sheet, and wherein the thermal conductivity of the second insulating sheet is higher than thermal conductivity of the third insulating sheet.

5. A magnetic component comprising:
a core provided with a leg; and
the coil structure, according to claim 1, wrapped around the leg.

* * * * *